US012630393B2

(12) United States Patent
Roberts et al.

(10) Patent No.: US 12,630,393 B2
(45) Date of Patent: May 19, 2026

(54) ELEVATOR ROPING SWAY MONITORING SYSTEM

(71) Applicant: OTIS ELEVATOR COMPANY, Farmington, CT (US)

(72) Inventors: Randy Roberts, Hebron, CT (US); George Scott Copeland, Wethersfield, CT (US); Patricia Derwinski, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1150 days.

(21) Appl. No.: 17/586,207

(22) Filed: Jan. 27, 2022

(65) Prior Publication Data

US 2023/0234810 A1 Jul. 27, 2023

(51) Int. Cl.
*B66B 7/12* (2006.01)
*B66B 1/28* (2006.01)
*B66B 1/34* (2006.01)
*B66B 5/02* (2006.01)

(52) U.S. Cl.
CPC .............. *B66B 7/1215* (2013.01); *B66B 1/28* (2013.01); *B66B 1/3492* (2013.01); *B66B 5/02* (2013.01)

(58) Field of Classification Search
CPC ....... B66B 7/1215; B66B 1/28; B66B 1/3492; B66B 5/02; B66B 7/068; B66B 7/06
USPC .......................................................... 287/247
See application file for complete search history.

(56) References Cited

U.S. PATENT DOCUMENTS

2013/0275081 A1 10/2013 Benosman et al.
2015/0008075 A1* 1/2015 Benosman ................ B66B 7/06 187/247
2018/0016117 A1* 1/2018 Palazzola .................. B66B 7/06
2020/0407191 A1 12/2020 Roberts

FOREIGN PATENT DOCUMENTS

CN 108946360 A 12/2018
CN 111606163 A * 9/2020
JP 2006124102 A 5/2006
JP 2020132427 A 8/2020
WO 2016/120373 A1 8/2016

OTHER PUBLICATIONS

Extended European Search Report for Application No. EP 22 20 8425.3 dated Jun. 6, 2023.
Extended European Search Report for Application No. EP 19216916.7 dated Jul. 20, 2020.

* cited by examiner

*Primary Examiner* — Jorge L Carrasquillo
(74) *Attorney, Agent, or Firm* — Carlson, Gaskey & Olds, P.C.

(57) ABSTRACT

An illustrative example embodiment of system includes at least one detector that detects a horizontal position of elevator roping at a selected vertical location. The detector provides an indication of the horizontal position at the selected vertical location in two dimensions. A processor determines at least an amplitude and a frequency of sway of the elevator roping in each of the two dimensions at the selected vertical location based on the indication from the detector.

22 Claims, 3 Drawing Sheets

ELEVATOR ROPING SWAY MONITORING SYSTEM

BACKGROUND

Elevator systems are useful for carrying passengers and items between different levels of a building. Elevator systems in high rise buildings typically are traction-based and include roping that suspends the elevator car and a counterweight. A machine causes movement of a traction sheave that, in turn, causes movement of the roping for moving the elevator car as desired.

Elevator roping arrangements may experience sway under a variety of conditions, especially in ultrahigh rise buildings. A variety of approaches have been proposed to address elevator roping sway including using dampers in the hoistway and controlling elevator car movement to mitigate sway. One shortcoming of some known approaches is that the information regarding rope sway is limited or imprecise. For example, some systems rely on detecting building sway or outside wind speed and inferring a sway condition of the elevator roping.

SUMMARY

An illustrative example embodiment of system includes at least one detector that detects a horizontal position of elevator roping at a selected vertical location. The detector provides an indication of the horizontal position at the selected vertical location in two dimensions. A processor determines at least an amplitude and a frequency of sway of the elevator roping in each of the two dimensions at the selected vertical location based on the indication from the detector.

In addition to one or more of the features described above, or as an alternative, the elevator roping comprises a plurality of elongated members and the at least one detector provides the indication for each of the plurality of elongated members.

In addition to one or more of the features described above, or as an alternative, the system includes an elevator car; a counterweight; and an elevator controller that is configured to control movement and position of the elevator car, wherein the elevator roping couples the elevator car and the counterweight; and the elevator controller controls at least one of movement or position of the elevator car based on the determined amplitude and frequency of the sway of the elevator roping.

In addition to one or more of the features described above, or as an alternative, the elevator controller controls the at least one of movement or position of the elevator car based on a position of the elevator car corresponding to the determined amplitude and frequency of sway of the elevator roping at the selected vertical location.

In addition to one or more of the features described above, or as an alternative, the elevator controller changes at least one of a speed of elevator car movement, a number of floors serviced by the elevator car, and a number of potential parking locations for the elevator car based on at least one characteristic of the determined amplitude and frequency of the elevator roping.

In addition to one or more of the features described above, or as an alternative, the elevator controller places the elevator car into a shutdown mode when the at least one characteristic satisfies a predetermined criterion.

In addition to one or more of the features described above, or as an alternative, the elevator roping comprises at least one of a suspension member, a compensation member, or a governor member.

In addition to one or more of the features described above, or as an alternative, the at least one detector comprises a first detector that detects the horizontal position of the elevator roping at a first vertical location, the first detector providing an indication of the horizontal position at the first vertical location in two dimensions; and a second detector that detects the horizontal position of the elevator roping at a second vertical location that is different than the first vertical location, the second detector providing an indication of the horizontal position at the second vertical location in two dimensions; and the processor determines at least the amplitude and the frequency of sway of the elevator roping in each of the two dimensions at each of the first and second vertical locations based on the indications from the first detector and the second detector.

In addition to one or more of the features described above, or as an alternative, the processor is configured to determine an amount of elevator roping sway along at least a portion of a length of the elevator roping; and the portion of the length spans a distance at least as long as a distance from the first vertical location to the second vertical location.

In addition to one or more of the features described above, or as an alternative, the system includes at least one additional detector that detects a horizontal position of the elevator roping at an additional vertical location that is different from the first vertical location and the second vertical location, the at least one additional detector providing an indication of the horizontal position at the additional vertical location in two dimensions.

An illustrative example embodiment of a method of monitoring elevator roping sway includes detecting a horizontal position of elevator roping at a selected vertical location using at least one detector that provides an indication of the horizontal position at the selected vertical location in two dimensions; and determining at least an amplitude and a frequency of sway of the elevator roping in each of the two dimensions at the selected vertical location based on the indication from the at least one detector.

In addition to one or more of the features described above, or as an alternative, the elevator roping comprises a plurality of elongated members and the detecting comprises detecting the horizontal position for each of the plurality of elongated members at the selected vertical location.

In addition to one or more of the features described above, or as an alternative, the elevator roping couples an elevator car and a counterweight; an the method includes determining a vertical position of the elevator car; determining a sway condition of the elevator roping based on the vertical position of the elevator car and the amplitude and frequency of the elevator roping; and controlling at least one of movement or position of the elevator car based on the sway condition of the elevator roping.

In addition to one or more of the features described above, or as an alternative, controlling the at least one of movement or position of the elevator car is based on the vertical position of the elevator car.

In addition to one or more of the features described above, or as an alternative, controlling the at least one of movement or position of the elevator car includes changing at least one of a speed of elevator car movement, a number of floors serviced by the elevator car, and a number of potential parking locations for the elevator car based on at least one characteristic of the sway condition of the elevator roping.

In addition to one or more of the features described above, or as an alternative, controlling the at least one of movement or position of the elevator car includes placing the elevator car into a shutdown mode when the at least one characteristic satisfies a predetermined criterion.

In addition to one or more of the features described above, or as an alternative, the elevator roping comprises at least one of a suspension member, a compensation member, or a governor member.

In addition to one or more of the features described above, or as an alternative, detecting the horizontal position of the elevator roping comprises: detecting the horizontal position of the elevator roping at a first vertical location using a first detector that provides an indication of the horizontal position at the first vertical location in two dimensions; and detecting the horizontal position of the elevator roping at a second vertical location that is different than the first vertical location using a second detector that provides an indication of the horizontal position at the second vertical location in two dimensions. Determining at least the amplitude and the frequency of sway of the elevator roping in each of the two dimensions comprises determining the amplitude and the frequency at each of the first and second vertical locations based on the indications from the first detector and the second detector.

In addition to one or more of the features described above, or as an alternative, the method includes determining an amount of elevator roping sway along at least a portion of a length of the elevator roping based on the amplitude and sway determined at each of the first and second vertical locations, wherein the portion of the length spans a distance at least as long as a distance from the first vertical location to the second vertical location.

In addition to one or more of the features described above, or as an alternative, the method includes detecting a horizontal position of the elevator roping at an additional vertical location that is different from the first vertical location and the second vertical location using at least one additional detector that provides an indication of the horizontal position at the additional vertical location in two dimensions.

The various features and advantages of at least one disclosed example embodiment will become apparent to those skilled in the art from the following detailed description. The drawings that accompany the detailed description can be briefly described as follows.

DETAILED DESCRIPTION

Figure 1:
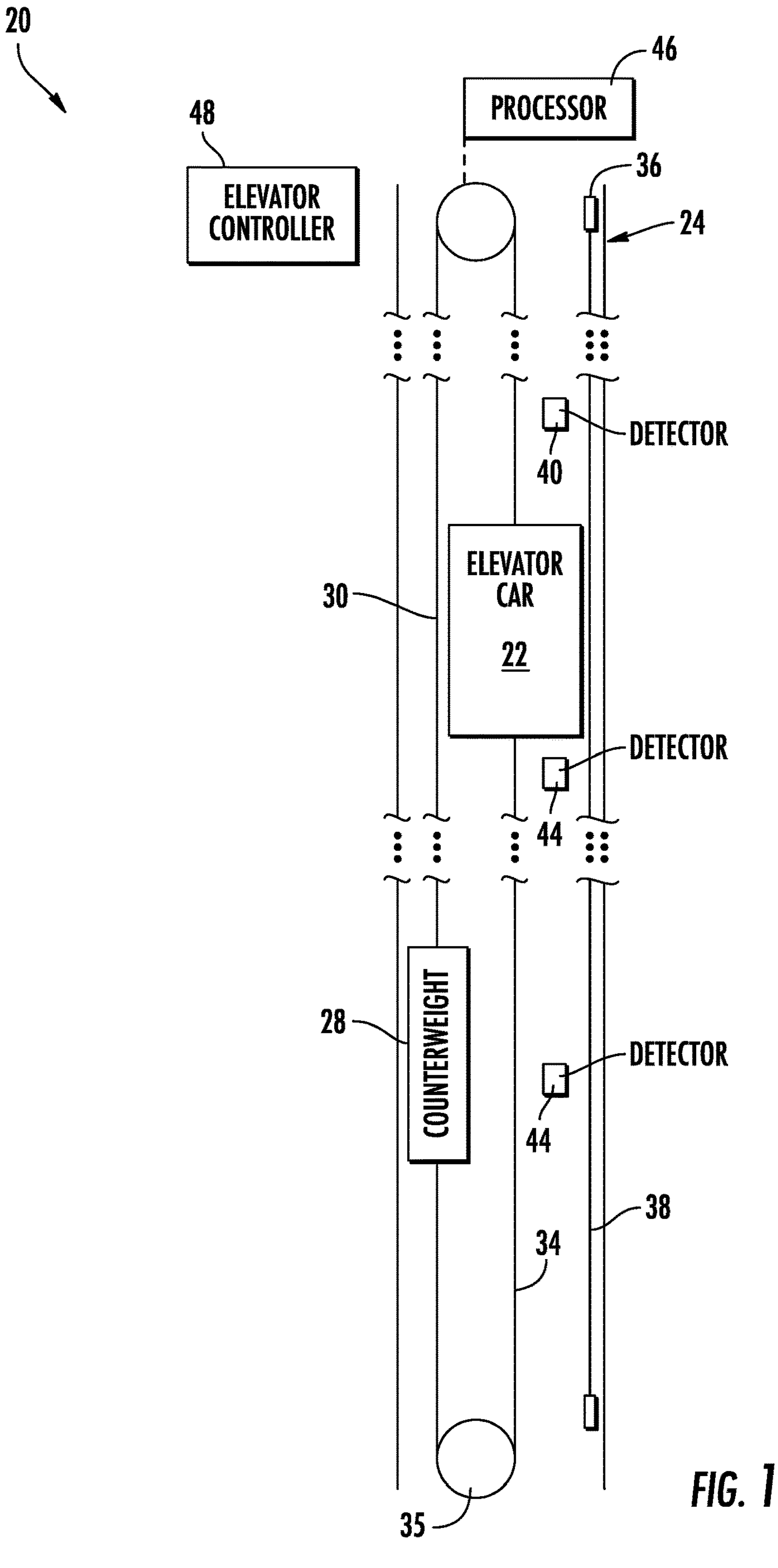
FIG. 1 schematically illustrates selected portions of an elevator including a rope sway detection system designed according to an embodiment of this disclosure.

FIG. 1 schematically shows selected portions of an elevator 20. An elevator car 22 is situated for movement along a vertical path in a hoistway 24. The elevator car 22 is coupled with a counterweight 28 by suspension roping 30. A 1:1 roping arrangement is illustrated for discussion purposes. Some embodiments include a different roping ratio. A traction sheave 32 is associated with a machine (not specifically illustrated) to cause selected movement of the suspension roping 30 to control the movement and position of the elevator car 22 within the hoistway 24. Compensation roping 34 is associated with the elevator car 22, a compensation sheave 35, and the counterweight 28. A governor 36 includes governor roping 38 that moves with the elevator car 22 for activating safeties (not illustrated) in a manner that is understood by those skilled in the art. Other elongated members that are known in the art, such as a traveling cable for power and communication, are not shown in FIG. 1 to keep the illustration simplified.

The term "roping" used in this document refers to elongated members that may comprise round ropes, flat belts or cables. The term "roping" should not be understood to be limited in any strict sense. Those skilled in the art know what types of elongated members may be used for traction, suspension, compensation or other purposes within an elevator system so a listing of those options is not provided here.

The elevator 20 includes a sway monitoring system to monitor sway of at least one of the elongated members in the hoistway 24. The sway monitoring system may be used to monitor the suspension roping 30, the compensation roping 34, the governor roping 38 or other elongated members, such as a traveling cable. In some embodiments, the suspension roping 30 is the only elevator roping that is monitored. In other embodiments, a combination of more than one type of roping is monitored for determining roping sway conditions within the hoistway 24. For discussion purposes, the suspension roping 30 will be considered below.

The elevator 20 includes at least one detector for detecting sway. The illustrated example embodiment includes a plurality of detectors. A first detector 40 detects a horizontal position of the suspension roping 30 at a first vertical location within the hoistway 24. The first detector 40 provides an indication of the horizontal position at the first vertical location in two dimensions. A second detector 42 is situated at a second vertical location along the hoistway 24. The second detector 42 detects a horizontal position of the suspension roping 30 at the second vertical location and provides an indication of that horizontal position in two dimensions. Additional detectors, such as a third detector 44, are situated at additional vertical locations along the hoistway 24. The third detector 44 detects a horizontal position of the suspension roping 30 and provides an indication of that horizontal position in two dimensions.

Each of the detectors 40, 42 and 44 provides its respective indication to a processor 46 that determines at least an amplitude and a frequency of sway of the suspension roping 30 in each of the two dimensions at each of the vertical locations based on those indications. The processor 46 communicates information regarding the determined amplitude and frequency to an elevator controller 48 that is configured to control movement or position of the elevator car 22 based on information from the processor 46.

Figure 2:
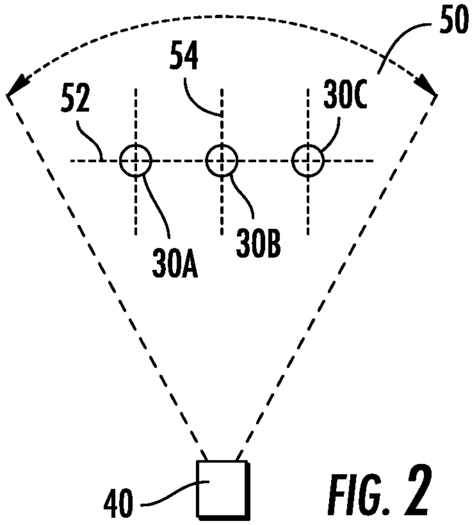
FIG. 2 schematically illustrates operation of an elevator roping sway detector useful in an example embodiment.

FIG. 2 schematically illustrates operation of the detectors, using the first detector 40 as an example. The suspension roping 30 includes multiple elongated suspension members 30A, 30B and 30C, which are all within a field of view 50 of the first detector 40. In some embodiments, the first detector 40 comprises a light detection and ranging (LiDAR) sensor that repeatedly scans across the area of the field of view 50 by emitting radiation and detecting radiation that reflects off of an object within the field of view. 50, such as the suspension roping members 30A, 30B and 30C.

While a LiDAR detector is used in some embodiments, other embodiments include a different type of device as at least one of the detectors 40-44. Other example detectors include stereoscopic cameras, red-green-blue-depth (RGB-D) cameras, or radio detection and ranging (RADAR) detectors. At least the LiDAR and RADAR type detectors operate using known time-of-flight detection techniques. Camera detectors use known image processing techniques. The specific devices used as the plurality of detectors of the roping sway monitoring system may vary to suit particular needs provided that the sensor provides horizontal position information in two dimensions.

Each detector, such as the first detector 40 shown in FIG. 2, provides an indication of changes in the horizontal position of the suspension roping members 30A-30C, respectively, in two dimensions. For example, the suspension roping members 30A-30C are shown in FIG. 2 in a desired or expected horizontal location under favorable conditions. Any lateral movement of any of the suspension roping members 30A-30C from side-to-side relative to the first detector 40 would occur in a first dimension 52. Any movement of any of the suspension roping members 30A-30C toward or away from the detector 40 occurs in a second dimension 54. The first detector 40 provides an indication of the horizontal position of each of the suspension roping members 30A-30C in each of the two dimensions 52 and 54. The two dimensions 52 and 54 are perpendicular to each other.

In some embodiments, the detectors provide an indication of aggregate or collective horizontal movement in the two dimensions. For example, the detector 40 provides an output or indication of an average amount of movement of the detected roping members 30A-30C. In some embodiments, the collective movement is based on a center of gravity of the detected roping members.

Each detector 40, 42, 44 provides such indications over time and the processor 46 is configured to determine a frequency at which each suspension roping member 30A-30C is moving based on a plurality of such indications. The processor 46 also is configured to determine the amplitude of displacement from a baseline or desired position in each of the two dimensions 52 and 54.

In some embodiments, the detectors 40-44 are capable of providing range rate information that indicates a speed of movement of the portion of the suspension roping members 30A-30C at the corresponding vertical location of the detector. The processor 46 is configured use range rate information to determine at least one characteristic of the sway movement of the roping under consideration in such embodiments.

Figure 3:
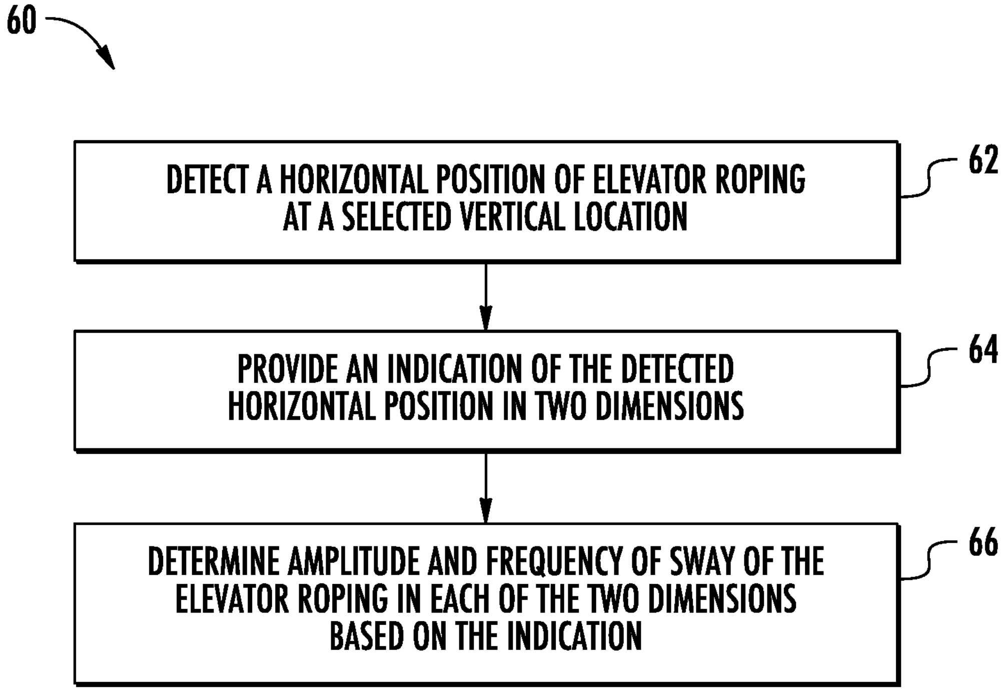
FIG. 3 is a flowchart diagram summarizing a method of monitoring elevator roping sway according to an example embodiment.

FIG. 3 includes a flow chart diagram 60 that summarizes an example approach to monitoring elevator roping sway within the hoistway 24. At 62, a horizontal position of the elevator roping is detected at a selected vertical location, using at least one of the detectors 40, 42, 44. At 64, the detector provides an indication of the detected horizontal position at the selected vertical location in two dimensions. At 66, the processor 46 determines an amplitude and frequency of sway of the elevator roping in each of the two dimensions based on the indication from the detector.

The type of information provided by the processor 46 to the elevator controller 48 allows the elevator controller 48 to make a better-informed decision regarding controlling movement and position of the elevator car 22. Given the position of the elevator car 22 corresponding to (i.e., at the time of) the detected roping sway, the elevator controller 48 is able to determine a best course of action for minimizing adverse effects on the elevator car 22 and other portions of the elevator system 20 that may otherwise result under the current roping sway conditions. For example, the elevator controller 48 may apply a different type of control when the elevator car 22 is near a top of the hoistway 24 compared to a condition in which the elevator car 22 is near a bottom of the hoistway for a given sway condition.

Information regarding the position of the elevator car factors into determining whether detected horizontal movement of the elevator roping corresponding to a sway condition that is of concern or requires reactive control by the elevator controller 48. A current amount of horizontal movement of the suspension roping 30 may be of less concern for a first position of the elevator car 22 compared to when the elevator car 22 is in a second, different position along the hoistway 24. The elevator controller 48 is configured to utilize information regarding the amplitude and frequency of the roping sway and the elevator car position for selecting how to control the movement or position of the elevator car 22. Under some conditions, the elevator controller 48 will place the elevator car 22 into a shutdown mode when at least one characteristic of the amplitude and frequency of the elevator roping sway satisfies a predetermined criterion.

The elevator controller 48 is configured to select from several control features or modes. For example, the elevator controller 48 is configured to determine whether to change a speed of elevator car movement, a number of floors that can be serviced by the elevator car, and a number of potential parking locations for the elevator car based on at least one characteristic of the determined amplitude and frequency of the horizontal movement or sway of the elevator roping.

Sway indications from multiple detectors 40-42 and information regarding the position of the elevator car 22 allow for determining a mode of vibration or sway. Different modes will occur for different combinations of sway and car position. In some embodiments, mode information is predetermined and the elevator controller 48 uses the mode information when determining which control option to implement. This approach allows for avoiding specific floors or moving the elevator car 22 at specific speeds, for example, during specific modes of vibration or sway.

Since the elevator controller 48 is configured to select from among several control options based on the sway condition and elevator car position, the disclosed example embodiment provides an improvement over a system that requires the elevator car to stop under any sway condition. The information regarding the current elevator car position combined with the amplitude and frequency of the roping sway allows the elevator controller 48 to apply a conservative control strategy that can leave the elevator car 22 in service rather than always requiring that the elevator car 22 be placed in a shutdown mode.

Figure 4:
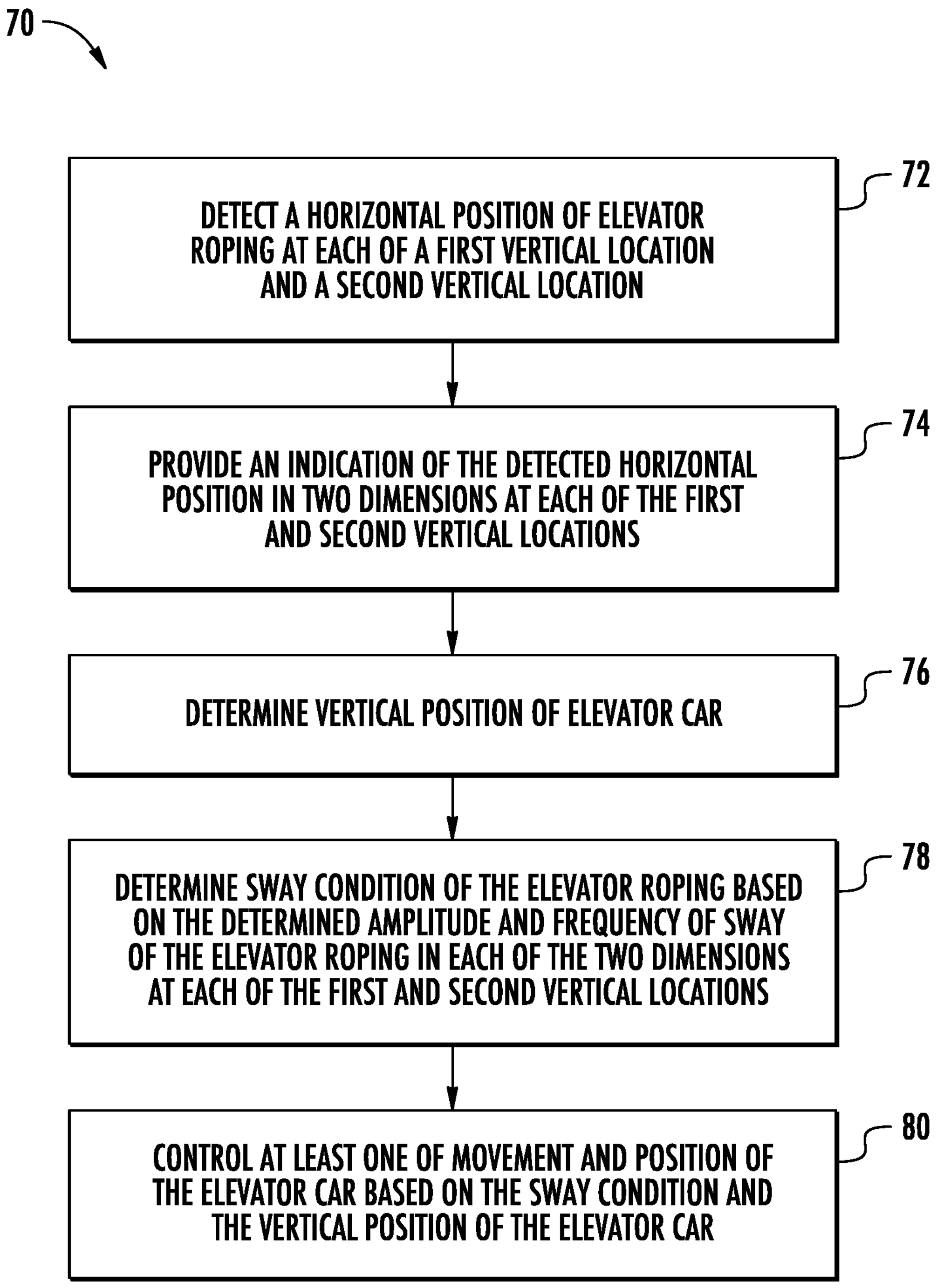
FIG. 4 is a flowchart diagram summarizing a method of using elevator roping sway information to control elevator car position or movement according to an example embodiment.

FIG. 4 includes a flowchart diagram 70 that summarizes an example approach of controlling position or movement of the elevator car 22 based on the roping sway information obtained using a plurality of detectors. At 72, the first detector 40 detects the horizontal position of the elevator roping at a first vertical location and the second detector 42 detects the horizontal position of the elevator roping at a second, different vertical location. At 74, the first detector 40 and the second detector 42 provide an indication of the detected horizontal position in two dimensions at the respective vertical locations. At 76, the elevator controller 48 determines the vertical position of the elevator car 22 using information from a known car position sensor, for example. At 78, the sway condition of the elevator roping based on the determined amplitude and frequency of sway in each of the two dimensions at each of the first and second vertical locations is determined. The sway condition may be determined by the processor 46, the elevator controller 48, or a combination of them. For example, although the processor 46 is schematically shown as a separate device from the elevator controller 48, the processing capabilities of the processor 46 mentioned in this description may be integrated into the same device that performs the functions of the elevator controller 48. At 80, the elevator controller 48 controls at least one of movement and position of the elevator car 22 based on the current sway condition of the elevator roping and the current vertical position of the elevator car 22.

The example embodiments include the capability to obtain direct measurements of elevator roping sway movement in two dimensions at one vertical location or multiple locations along a hoistway to provide precise measurement of the elevator roping sway movement. The direct measurement information improves and optimizes elevator control in response to roping sway conditions.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system, comprising:

at least one detector that detects a horizontal position of elevator roping at a selected vertical location, the at least one detector providing an indication of the horizontal position at the selected vertical location in two dimensions;

the elevator roping includes multiple elongated suspension members that are all within a field of view of the at least one detector, and wherein:

lateral movement of any of the multiple elongated suspension members from side-to-side relative to the at least one detector within the field of view occurs in a first dimension of the two dimensions; and any movement of any of the multiple elongated suspension members toward or away from the at least one detector within the field of view occurs in a second dimension of the two dimensions; and a processor that determines at least an amplitude and a frequency of sway of the elevator roping in each of the two dimensions at the selected vertical location based on the indication from the at least one detector.

2. The system of claim 1, wherein the at least one detector provides the indication for each of the multiple elongated suspension members.

3. The system of claim 1, comprising:

an elevator car;

a counterweight; and an elevator controller that is configured to control movement and position of the elevator car, wherein the elevator roping couples the elevator car and the counterweight; and the elevator controller controls at least one of movement or position of the elevator car based on the determined amplitude and frequency of the sway of the elevator roping.

4. The system of claim 3, wherein the elevator controller controls the at least one of movement or position of the elevator car based on a position of the elevator car corresponding to the determined amplitude and frequency of sway of the elevator roping at the selected vertical location.

5. The system of claim 4, wherein the elevator controller changes at least one of a speed of elevator car movement, a number of floors serviced by the elevator car, and a number of potential parking locations for the elevator car based on at least one characteristic of the determined amplitude and frequency of the elevator roping.

6. The system of claim 5, wherein the elevator controller places the elevator car into a shutdown mode when the at least one characteristic satisfies a predetermined criterion.

7. The system of claim 1, wherein the elevator roping comprises at least one of a suspension member, a compensation member, or a governor member.

8. The system of claim 1, wherein the at least one detector comprises:

a first detector that detects the horizontal position of the elevator roping at a first vertical location, the first detector providing an indication of the horizontal position at the first vertical location in two dimensions, wherein the multiple elongated suspension members are all within a first field of view of the first detector, and wherein lateral movement of any of the multiple elongated suspension members from side-to-side relative to the first detector within the first field of view occurs in a first dimension of the two dimensions, and any movement of any of the multiple elongated suspension members toward or away from the first detector within the first field of view occurs in a second dimension of the two dimensions; and a second detector, vertically spaced apart from the first detector, that detects the horizontal position of the elevator roping at a second vertical location that is different than the first vertical location, the second detector providing an indication of the horizontal position at the second vertical location in two dimensions, wherein the multiple elongated suspension members are all within a second field of view of the second detector, and wherein lateral movement of any of the multiple elongated suspension members from side-to-side relative to the second detector within the second field of view occurs in a first dimension of the two dimensions, and any movement of any of the multiple elongated suspension members toward or away from the second detector within the second field of view occurs in a second dimension of the two dimensions; and the processor determines at least the amplitude and the frequency of sway of the elevator roping in each of the two dimensions for each of the first and second fields of view at each of the first and second vertical locations based on the indications from the first detector and the second detector.

9. The system of claim 8, wherein the processor is configured to determine an amount of elevator roping sway along at least a portion of a length of the elevator roping; and the portion of the length spans a distance at least as long as a distance from the first vertical location to the second vertical location.

10. The system of claim 8, comprising at least one additional detector that detects a horizontal position of the elevator roping at an additional vertical location that is different from the first vertical location and the second vertical location, the at least one additional detector providing an indication of the horizontal position at the additional vertical location in two dimensions.

11. The system of claim 1, wherein the first dimension and the second dimension are co-planar within the field of view.

12. A method of monitoring elevator roping sway, the method comprising:

detecting a horizontal position of elevator roping at a selected vertical location using at least one detector that provides an indication of the horizontal position at the selected vertical location in two dimensions, wherein the elevator roping includes multiple elongated suspension members that are all within a field of view of the at least one detector;

lateral movement of any of the multiple elongated suspension members from side-to-side relative to the at least one detector within the field of view occurs in a first dimension of the two dimensions; and any movement of any of the multiple elongated suspension members toward or away from the at least one detector within the field of view occurs in a second dimension of the two dimensions; and determining at least an amplitude and a frequency of sway of the elevator roping in each of the two dimensions at the selected vertical location based on the indication from the at least one detector.

13. The method of claim 12, wherein the detecting comprises detecting the horizontal position for each of the multiple elongated suspension members at the selected vertical location.

14. The method of claim 12, wherein the elevator roping couples an elevator car and a counterweight; and the method comprises determining a vertical position of the elevator car;

determining a sway condition of the elevator roping based on the vertical position of the elevator car and the amplitude and frequency of the elevator roping; and controlling at least one of movement or position of the elevator car based on the sway condition of the elevator roping.

15. The method of claim 14, wherein controlling the at least one of movement or position of the elevator car is based on the vertical position of the elevator car.

16. The method of claim 15, wherein controlling the at least one of movement or position of the elevator car includes changing at least one of a speed of elevator car movement, a number of floors serviced by the elevator car, and a number of potential parking locations for the elevator car based on at least one characteristic of the sway condition of the elevator roping.

17. The method of claim 16, wherein controlling the at least one of movement or position of the elevator car includes placing the elevator car into a shutdown mode when the at least one characteristic satisfies a predetermined criterion.

18. The method of claim 12, wherein the elevator roping comprises at least one of a suspension member, a compensation member, or a governor member.

19. The method of claim 12, wherein the at least one detector comprises at least a first detector and a second detector, and including spacing the first detector apart from the second detector in a vertical direction of a hoistway: wherein detecting the horizontal position of the elevator roping comprises:

detecting the horizontal position of the elevator roping at a first vertical location using the first detector that provides an indication of the horizontal position at the first vertical location in two dimensions, wherein the multiple elongated suspension members are all within a first field of view of the first detector, and wherein lateral movement of any of the multiple elongated suspension members from side-to-side relative to the first detector within the first field of view occurs in a first dimension of the two dimensions, and any movement of any of the multiple elongated suspension members toward or away from the first detector within the first field of view occurs in a second dimension of the two dimensions; and detecting the horizontal position of the elevator roping at a second vertical location that is different than the first vertical location using the second detector that provides an indication of the horizontal position at the second vertical location in two dimensions, wherein the multiple elongated suspension members are all within a second field of view of the second detector, and wherein lateral movement of any of the multiple elongated suspension members from side-to-side relative to the second detector within the second field of view occurs in a first dimension of the two dimensions, and any movement of any of the multiple elongated suspension members toward or away from the second detector within the second field of view occurs in a second dimension of the two dimensions; and determining at least the amplitude and the frequency of sway of the elevator roping in each of the two dimensions comprises determining the amplitude and the frequency in each of the two dimensions for each of the first and second fields of view at each of the first and second vertical locations based on the indications from the first detector and the second detector.

20. The method of claim 19, comprising determining an amount of elevator roping sway along at least a portion of a length of the elevator roping based on the amplitude and sway determined at each of the first and second vertical locations, wherein the portion of the length spans a distance at least as long as a distance from the first vertical location to the second vertical location.

21. The method of claim 19, comprising detecting a horizontal position of the elevator roping at an additional vertical location that is different from the first vertical location and the second vertical location using at least one additional detector that provides an indication of the horizontal position at the additional vertical location in two dimensions.

22. The method of claim 12, wherein the first dimension and the second dimension are co-planar within the field of view.

* * * * *